United States Patent [19]

Thomas

[11] Patent Number: 5,538,294
[45] Date of Patent: Jul. 23, 1996

[54] CORRUGATED FLEXIBLE METAL PIPING ASSEMBLY

[75] Inventor: R. Winfield Thomas, West Lebanon, Ind.

[73] Assignee: Tru-Flex Metal Hose Corporation, West Lebanon, Ind.

[21] Appl. No.: 332,842

[22] Filed: Nov. 1, 1994

[51] Int. Cl.⁶ ........................................ F16L 9/14
[52] U.S. Cl. .................... 285/55; 285/175; 285/226; 285/334.5; 285/386; 285/903; 285/906; 138/128; 138/171
[58] Field of Search .................... 285/226, 903, 285/390, 384, 55, 175, 334, 386, 906; 138/121, 122, 171, 128

[56] References Cited

U.S. PATENT DOCUMENTS

| | | |
|---|---|---|
| 925,317 | 6/1909 | Eldred . |
| 1,133,070 | 3/1915 | Subers . |
| 1,315,548 | 9/1919 | Fletcher et al. . |
| 1,913,390 | 6/1933 | Hungerford . |
| 1,978,529 | 10/1934 | Harrah . |
| 2,013,193 | 9/1935 | Stadtfeld . |
| 2,257,895 | 10/1941 | Woodford et al. . |
| 2,365,181 | 12/1944 | Fentress . |
| 2,419,453 | 4/1947 | Kocevar . |
| 2,420,153 | 5/1947 | Sprenger et al. . |
| 2,516,631 | 7/1950 | Jacobson . |
| 2,582,249 | 1/1952 | Hendel ............................ 285/226 |
| 2,609,002 | 9/1952 | Meissner . |
| 2,628,112 | 2/1953 | Smalline . |
| 2,666,657 | 1/1954 | Howard et al. .................. 285/226 X |
| 2,841,183 | 7/1958 | Rejeski . |
| 2,857,176 | 10/1958 | McTaggert et al. . |
| 2,867,242 | 1/1959 | Harris et al. .................... 285/226 X |
| 3,056,616 | 10/1962 | Jaros . |
| 3,086,556 | 4/1963 | Kanter . |
| 3,135,295 | 6/1964 | Ziebold . |
| 3,169,785 | 2/1965 | Ziebold . |
| 3,232,076 | 2/1966 | Sundt ............................... 285/226 X |
| 3,273,916 | 9/1966 | Tillery ............................. 285/226 |
| 3,299,417 | 1/1967 | Sibthorpe . |
| 3,393,267 | 7/1968 | Busse . |
| 3,549,176 | 12/1970 | Contreras . |
| 3,600,009 | 8/1971 | Shupper ......................... 285/226 X |
| 3,621,663 | 11/1971 | Otani . |
| 3,623,513 | 11/1971 | Dinkelkamp . |
| 3,743,328 | 7/1973 | Longfellow .................... 285/903 X |
| 3,759,552 | 9/1973 | Levinsohn et al. . |
| 3,815,639 | 6/1974 | Westerbarkey . |
| 3,948,295 | 4/1976 | Lemont et al. . |
| 4,141,385 | 2/1979 | Siegwart . |
| 4,147,185 | 4/1979 | Hines ............................... 138/121 |
| 4,186,779 | 2/1980 | Wagner ........................... 138/171 X |
| 4,262,162 | 4/1981 | Plinke et al. . |
| 4,303,105 | 12/1981 | Rohner . |
| 4,481,978 | 11/1984 | Escandell . |
| 4,811,976 | 3/1989 | Yagisawa . |
| 4,854,416 | 8/1989 | Lalikos et al. . |
| 5,015,018 | 5/1991 | Arnoldt . |
| 5,080,405 | 1/1992 | Sasa et al. ....................... 285/903 X |
| 5,165,727 | 11/1992 | Valley ............................. 285/390 X |
| 5,259,418 | 11/1993 | Hamrick ......................... 138/122 X |
| 5,348,051 | 9/1994 | Kallenbach ..................... 138/121 X |

Primary Examiner—Dave W. Arola
Attorney, Agent, or Firm—Litman, McMahon and Brown

[57] ABSTRACT

A flexible metal piping assembly includes a body with corrugations having spiral (helical) or annular configurations. End connections are mounted on the body ends, which can be flanged or male-threaded. A layer of insulating or sealing material can be applied over the body. The end connections can be male-threaded or female-threaded. A bellows configuration is provided with annular corrugations which taper in proximity to the body ends.

14 Claims, 2 Drawing Sheets

CORRUGATED FLEXIBLE METAL PIPING ASSEMBLY

BACKGROUND OF THE INVENTION

1. Field of the Invention

The present invention relates generally to flexible metal piping, and in particular to flexible metal piping sections with corrugations and various end connectors.

2. Description of the Related Art

Various types of flexible piping are well known and a variety of different designs have been devised for meeting the requirements of particular applications. For example, flexible metal piping is often used for conveying fluids where terminal portions thereof may move with respect to each other or may be misaligned. Flexible metal piping thus allows an installer to accommodate different field conditions, such as the misalignment of respective end fittings which are to be connected by the flexible metal piping section.

Flexible metal piping can also be used for bulk material conveyance. Flexible metal piping can be formed by a variety of techniques. For example, it can be formed by interlocking the leading and trailing edges of flat metal bands at interlocked joints which permit relative movement and thus provide flexibility. Flexible metal piping can also be formed from corrugated metal strips with interlocked leading and trailing edges whereby the flexibility is provided by the corrugations. An example of such flexible metal piping is shown in U.S. Pat. No. 925,317 for FLEXIBLE METALLIC TUBING.

For relatively heavy duty and high pressure applications, it can be preferable to minimize the length of the seam forming the flexible metal piping and thereby reduce possibilities of leakage and rupture. For example, a tubular section can be formed by rolling flat stock, such as sheet metal, and welding abutting edges thereof to form a longitudinally-extending seam. A single, longitudinally-extending seam can significantly reduce the total seam length over previous spiral-winding construction techniques.

The present invention addresses some of the problems and disadvantages with previous flexible metal piping assemblies.

SUMMARY OF THE INVENTION

In the practice of the present invention, a flexible piping assembly is provided which includes a body formed by rolling flat stock, such as sheet metal, in a tubular configuration and corrugating same. A longitudinal seam can be formed by welding abutting edges together. The corrugations formed in the body can have helical or annular configurations, and can taper in diameter towards the body ends. A layer of insulating or sealing material can be applied over the body for insulating or sealing same at a connection. The body ends can be flanged or male-threaded. Various end connectors can be provided on the body ends, and can be male-threaded or can include female-threaded receivers.

OBJECTS AND ADVANTAGES OF THE INVENTION

The principal objects and advantages of the present invention include providing a flexible piping assembly; providing such a piping assembly which includes various end connectors; providing such a piping assembly which can be roll formed from flat stock, such as sheet metal; providing such a piping assembly which is adapted for corrugating; providing such a piping assembly which can include spiral or helical corrugations; providing such a piping assembly which can be include annular corrugations; providing such a piping assembly which can include corrugations of varying diameter; providing such a piping assembly which can include an insulating or sealing layer; providing such a piping assembly which is adapted for forming of various materials; providing such a piping assembly which can receive end connectors of various types; providing such a piping assembly which can be male-threaded at its ends; providing such a piping assembly wherein the corrugations can comprise male-threading; providing such a piping assembly which can be flanged at one or both ends thereof; providing such a piping assembly which is adapted for manufacture in various lengths and diameters; and providing such a piping assembly which is economical to manufacture, efficient in operation and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

1. Introduction and Environment

Figure 1:
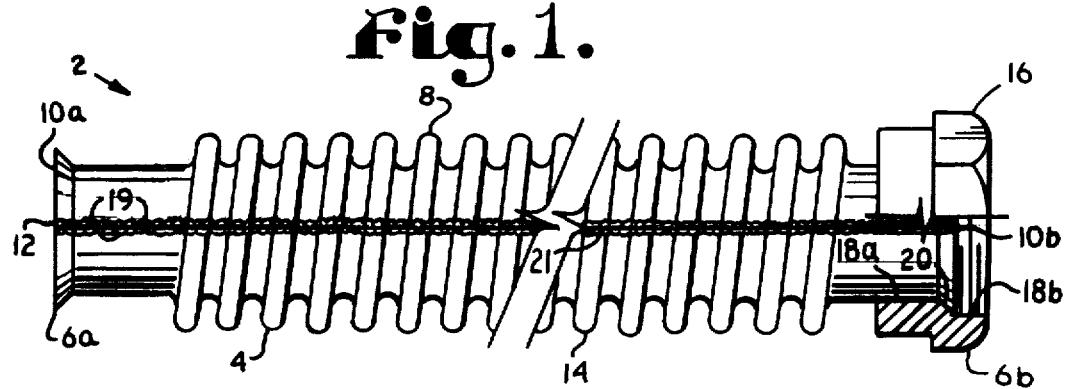
FIG. 1 is a fragmentary, side-elevational view of a flexible metal piping assembly.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

II. Primary Embodiment 2 (FIG. 1)

Referring to the drawings in more detail, the reference numeral 2 generally designates a flexible piping assembly generally comprising a piping body 4 and end connection means 6a, 6b. The piping body 4 includes a middle section 8 extending between opposite ends 10a and 10b with flanges 12.

As shown in FIG. 1, the middle section 8 has a generally constant diameter D and spiral-wound corrugations 14. Each end 10a, 10b is adapted for mounting a nut 16 including a first, smooth-bore receiver portion 18a and a second, female-threaded receiver portion 18b. The receiver portions 18a, 18b are fluidically interconnected and are separated by a tapered shoulder 20 adapted for engaging the flange 12.

The body 4 is preferably formed by rolling flat sheet-metal stock to form the corrugations 14 therein and by roll forming same whereby longitudinal edges 19 are brought into engagement for welding along a longitudinal welded seam 21.

Figure 2:
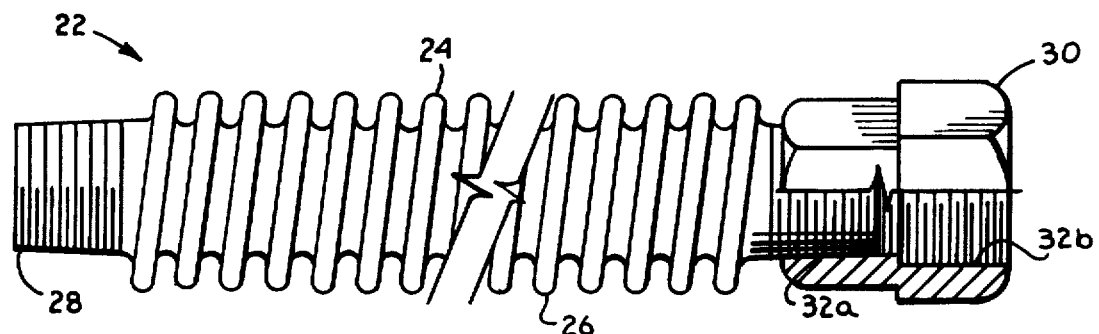
FIG. 2 is a fragmentary, side-elevational view of a flexible metal piping assembly comprising a first modified embodiment of the present invention.

III. First Modified Embodiment 22 (FIG. 2)

The reference numeral 22 generally designates a flexible metal piping assembly comprising a first modified or alternative embodiment of the present invention, and includes a body 24 with a generally constant diameter D and spiral-wound corrugations 26. The body 24 terminates at opposite, male-threaded ends 28 each adapted to receive a respective connecting nut 30 having proximate and distal female-threaded receiver portions 32a, 32b. Each connecting nut is adapted to receive a respective male-threaded fitting, pipe end or the like (not shown).

IV. Second Modified Embodiment 42 (FIG. 3)

Figure 3:
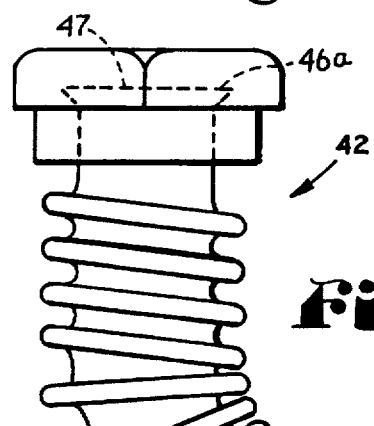
FIG. 3 is a side-elevational view of a flexible metal piping assembly comprising a second modified embodiment of the present invention.

A flexible metal piping assembly 42 comprising a second modified embodiment of the present invention is shown in FIG. 3 and is generally designated by the reference numeral 42. The piping assembly 42 includes a body section 44 with corrugations 45 having a generally constant cross-sectional configuration with a diameter D and a pair of opposite flanged ends 46a, 46b. Each end 46a, 46b includes a flange 47. A nut 16 with a female-threaded receiver is mounted on one end 46a and a nut 49 with a male-threaded, tapering nipple 48 is mounted on the other end 46b. The nut 49 includes a counterbore 51 adapted to receive the piping body end 46b in sealing engagement with a shoulder 50 adapted to engage the flange 47.

V. Third Modified or Alternative Embodiment 52 (FIG. 4)

Figure 4:
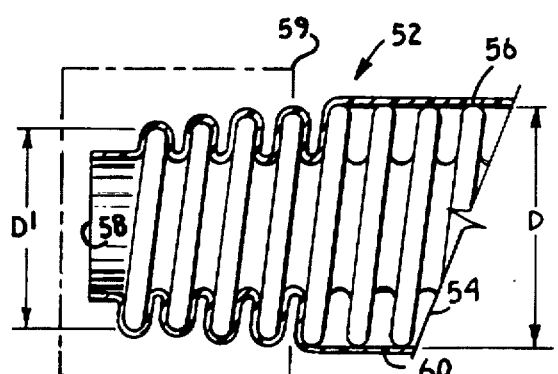
FIG. 4 is a fragmentary, side-elevational view of a flexible metal piping assembly comprising a third modified embodiment of the present invention.

The reference numeral 52 generally designates a flexible metal piping assembly comprising a third modified or alternative embodiment of the present invention shown in FIG. 4 and including a body 54 formed with spiral-wound corrugations 56 tapering towards an end 58 for threaded insertion in a connector 59 having a female-threaded receiver. The flexible metal piping section body 54 is encased in a sealing or insulating sleeve 60 which can comprise, for example, a suitable material such as polyvinyl chloride or other plastic, or any other suitable material chosen for the desired characteristics in a particular application.

VI. Fourth Modified Embodiment 62 (FIG. 5)

Figure 5:
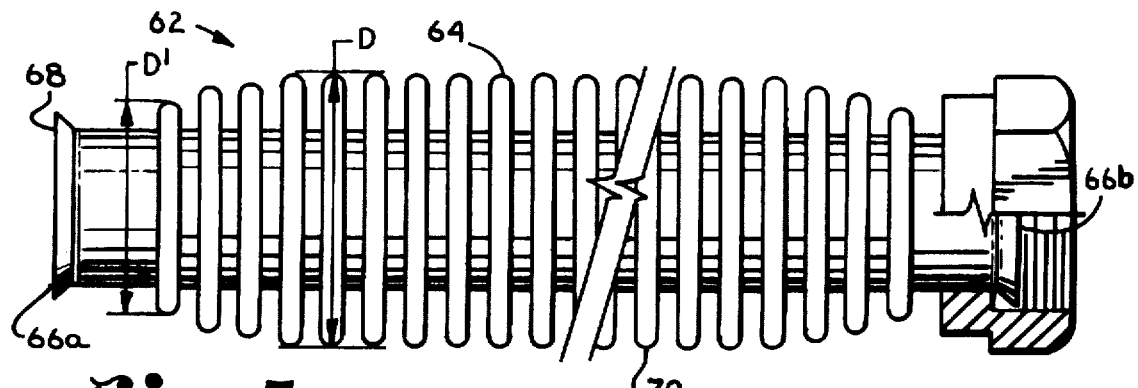
FIG. 5 is a fragmentary, side-elevational view of a flexible metal piping assembly comprising a fourth modified embodiment of the present invention.

A flexible metal piping section 62 comprising a fourth modified or alternative embodiment of the present invention is shown in FIG. 5 and includes a body section 64 with a generally constant diameter D in the middle thereof and tapering to ends 66a, 66b with flanges 68. The body section 64 includes generally annular corrugations 70 which form a bellows configuration adapted to dampen vibrations within the flexible metal piping section 62 and reduce the possibility of vibration-induced damage thereto. The tapering configurations of the body section 64 toward the ends 66a, 66b further reduces the effects of vibration since the resonant frequency of the body section 64 varies with its varying diameter. Thus, vibrations in certain frequency ranges are less likely to be transmitted from one end of the flexible metal piping 62 to the other. Each end 66a, 66b of the flexible metal piping 62 can mount a suitable connector such as the nut 16.

VII. Fifth Modified Embodiment 72 (FIG. 6)

Figure 6:
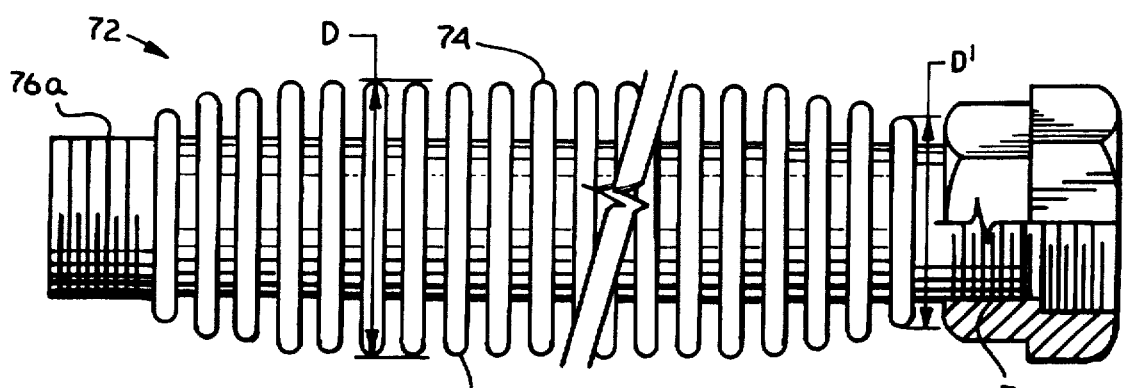
FIG. 6 is a fragmentary, side-elevational view of a flexible metal piping assembly comprising a fifth modified embodiment of the present invention.

A flexible metal piping assembly comprising a fifth modified or alternative embodiment of the present invention is shown in FIG. 6 and is generally designated by the reference numeral 72. The flexible metal piping assembly 72 includes a body section 74 with a diameter D which is relatively constant between opposite ends 76a, 76b thereof whereat the body 74 tapers to narrower diameters D'. The body 74 is formed with generally annular corrugations 78 which are positioned in generally parallel, spaced relation from each other and which decrease in diameter in proximity to and approaching the ends 76a, 76b. The ends 76a, 76b are male-threaded for mounting connecting nuts 30.

VIII. Fabrication and Operation

In operation the flexible metal piping assemblies 2, 22, 42, 52, 62 and 72 are adapted for use in a wide variety of specific applications, and can be varied by size, length and material selection to meet the requirements of various applications thereof. For example, the end connectors can be chosen for conditions encountered at each end of a respective metal piping section, and the ends can be formed differently to receive different types of connectors. Moreover, the corrugations can be either annular or spiral-shaped (i.e., helical), and can have tapered-converging or constant diameters in proximity to the flexible metal piping section ends.

The flexible metal piping sections can be fabricated by roll-forming and seam-welding along respective edges or by any other suitable method.

It is to be understood that while certain forms of the present invention have been illustrated and described herein, it is not to be limited to the specific forms or arrangement of parts described and shown.

What is claimed and desired to be secured by Letters Patent is as follows:

1. A flexible metal piping assembly, which includes:
  a) body having first and second ends;
  b) said body being corrugated
  c) said body having a longitudinally-extending weld seam extending generally perpendicularly with respect to said corrugations;
  d) said corrugations tapering towards said body ends and having decreasing diameters towards said ends; and
  e) threaded end connection means associated with at least one of said first and second ends.

2. The invention of claim 1 which includes a threaded configuration of said body corrugations.

3. The invention of claim 1 wherein said body means includes a flange mounting said end connection means.

4. The invention of claim 3 wherein said end connection means includes compression connection means engaging said flange and including threaded connection means.

5. The invention of claim 1 wherein:

(a) said body includes a male-threaded end; and (b) said end connection means comprises a nut having a proximate, female-threaded receiver portion receiving said male-threaded body end and a distal threaded portion.

6. The invention of claim 5 wherein said nut distal portion includes a female threaded receiver.

7. The invention of claim 6, which includes a frusto-conical shoulder formed between said nut proximate receiver and said nut distal receiver.

8. The invention of claim 6 wherein said nut distal portion comprises a male-threaded receiver.

9. The invention of claim 1, which includes:

(a) a sleeve covering said body and comprising a different material therefrom.

10. The invention of claim 9 wherein:

(a) said body material comprises metal and said sleeve material is polymeric.

11. The invention of claim 1 wherein said corrugations in said body are annular.

12. The invention of claim 1 wherein said corrugations in said body form spiral-wound threads.

13. A flexible metal piping assembly, which comprises:

(a) a body having first and second ends;

(b) said body having multiple, annular corrugations positioned in spaced, parallel relationship;

(c) said body having a longitudinally-extending weld seam extending generally perpendicularly with respect to said corrugations;

(d) said corrugations tapering towards said body ends and having decreasing diameters towards said ends;

(e) at least one of said body ends having a flange thereon; and (f) an end connector including:

(1) a smooth-bore receiver proximate portion receiving said one body end;

(2) a threaded distal portion communicating with said proximate portion; and (3) a frusto-conical shoulder engaging said flange in a sealing relationship therewith.

14. A flexible metal piping assembly, which includes:

(a) a body having a helical corrugation and opposite ends;

(b) said body converging towards the ends thereof;

(c) said corrugations having decreasing diameters towards said body ends as compared to the diameter thereof between said body ends;

(d) a sealing material applied to said body and extending between the ends thereof in covering relation over said body corrugations;

(e) said sealing material conforming generally to said corrugations in proximity to said body ends; and (f) an end connector with a female-threaded receiver receiving one of said body ends and the covering material thereon.

* * * * *